Aug. 25, 1959 R. O. BRADLEY 2,901,235
PLATFORM SUPPORTING STRUCTURE FOR WEIGHING SCALES
Filed Nov. 21, 1956 6 Sheets-Sheet 1
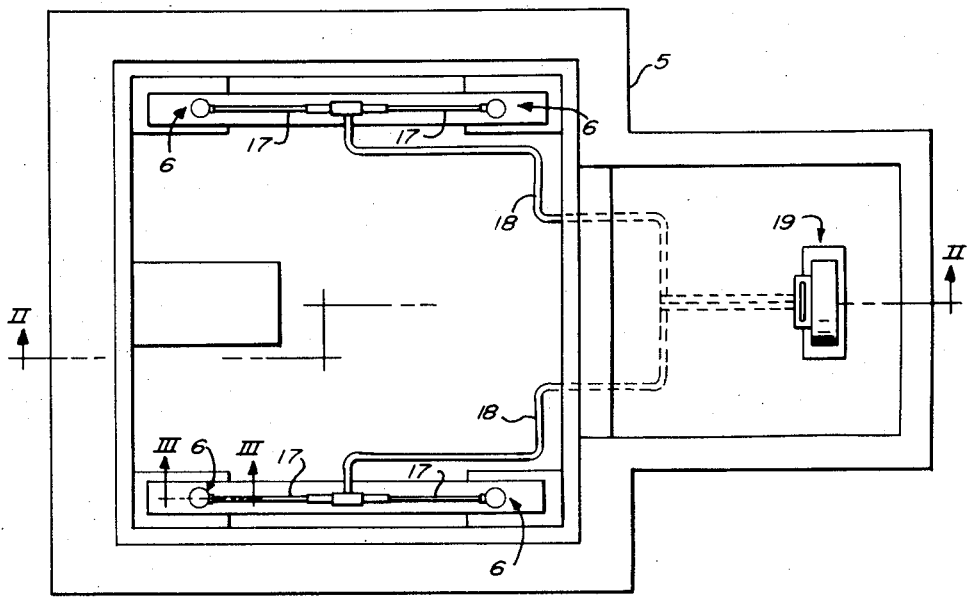
*Fig. I*
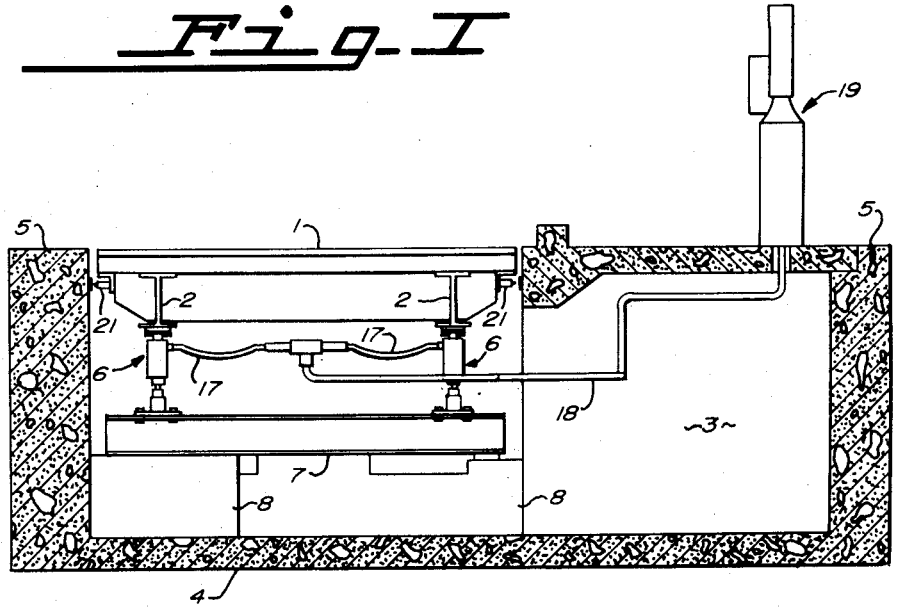
*Fig. II*
INVENTOR.
ROBERT O. BRADLEY
BY
Marshall, Marshall & Yeasting
ATTORNEYS

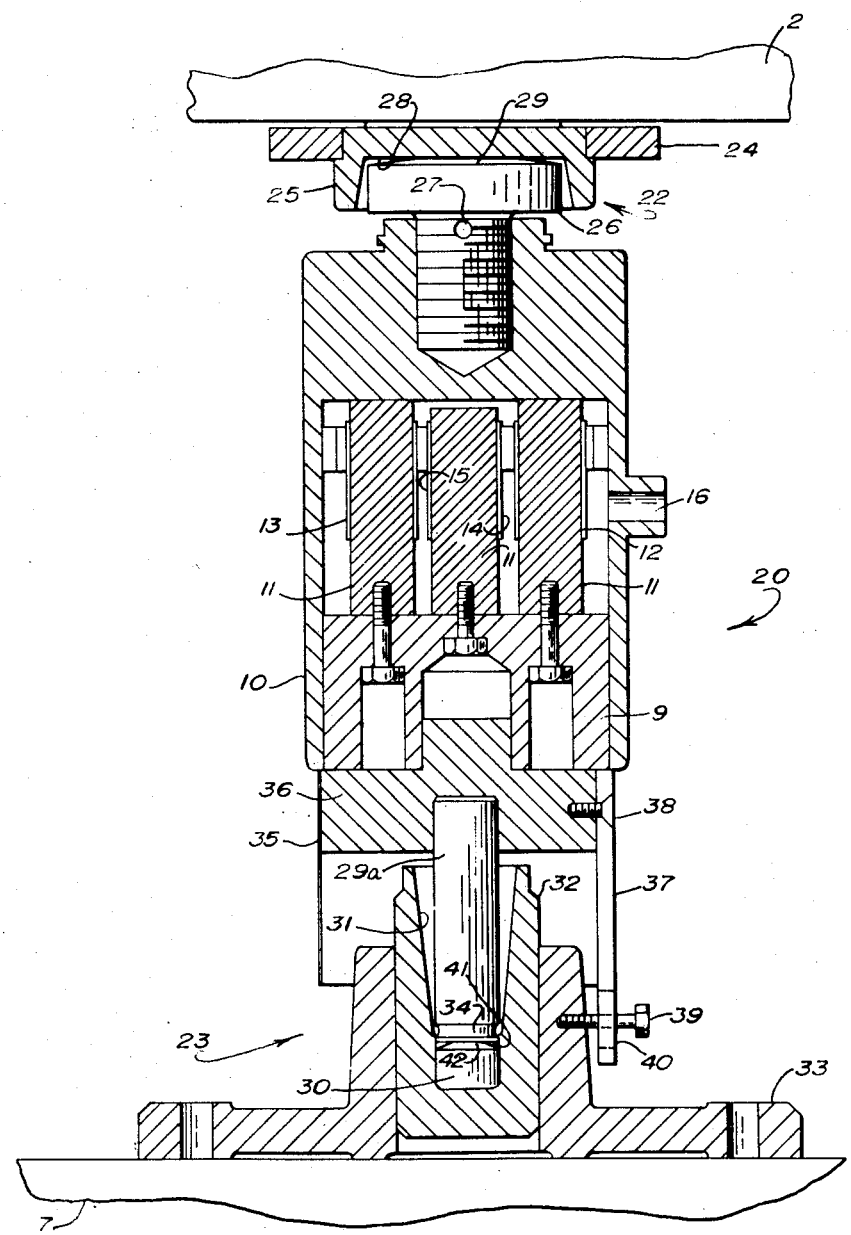
Fig. III

Aug. 25, 1959     R. O. BRADLEY     2,901,235
PLATFORM SUPPORTING STRUCTURE FOR WEIGHING SCALES
Filed Nov. 21, 1956     6 Sheets-Sheet 3
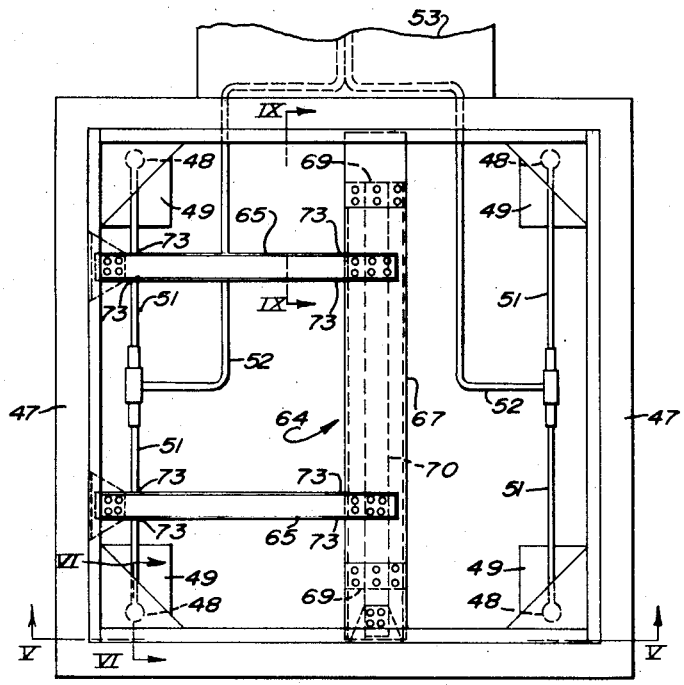
_Fig. IV_
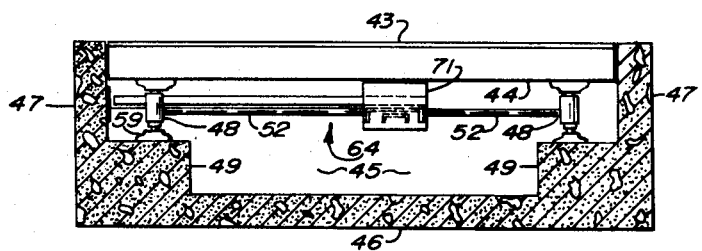
_Fig. V_
INVENTOR.
ROBERT O. BRADLEY
BY
Marshall, Marshall & Geasting
ATTORNEYS

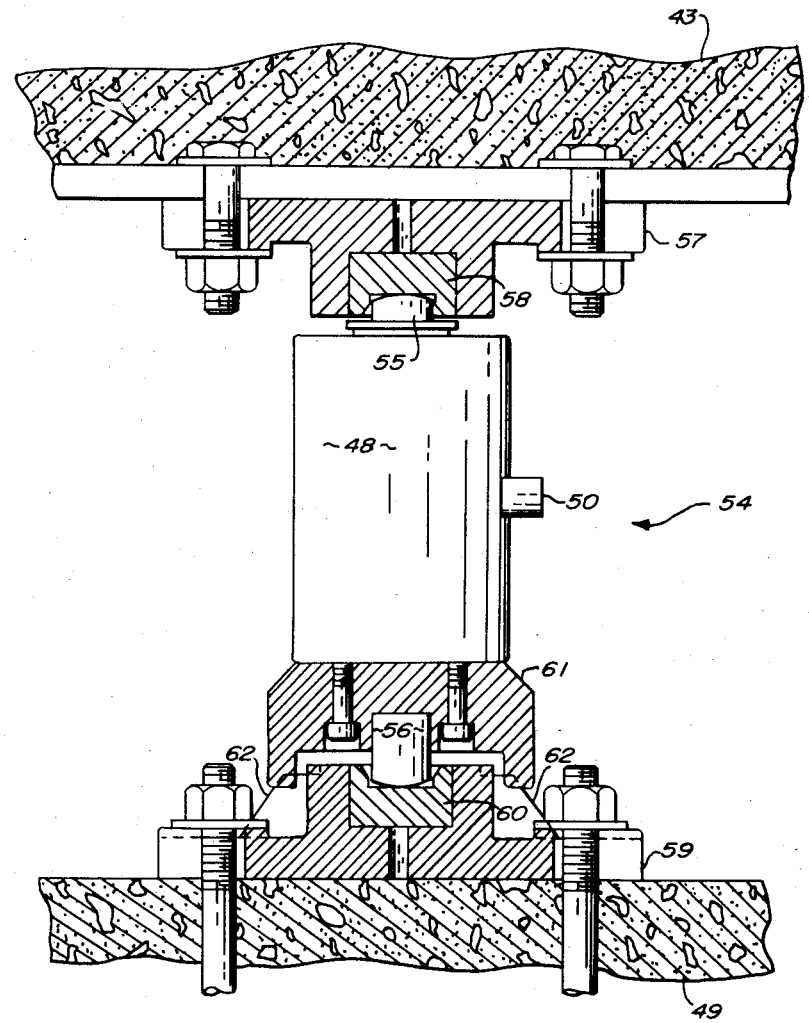
Fig. VI

Aug. 25, 1959   R. O. BRADLEY   2,901,235
PLATFORM SUPPORTING STRUCTURE FOR WEIGHING SCALES
Filed Nov. 21, 1956   6 Sheets-Sheet 5
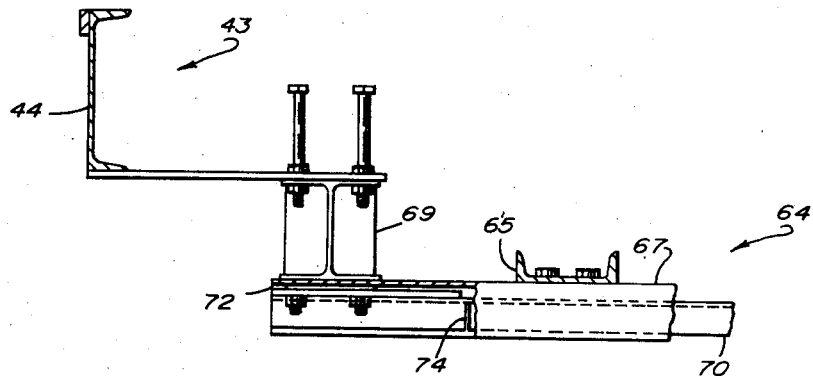
Fig. IX
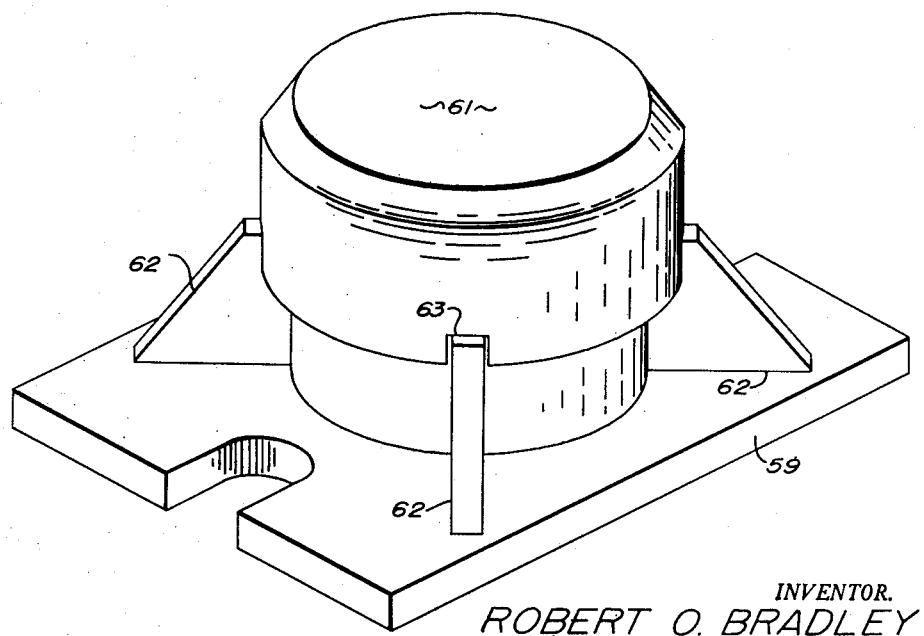
Fig. VII
INVENTOR.
ROBERT O. BRADLEY
BY
Marshall, Marshall & Gaasting
ATTORNEYS Aug. 25, 1959 R. O. BRADLEY 2,901,235
PLATFORM SUPPORTING STRUCTURE FOR WEIGHING SCALES
Filed Nov. 21, 1956 6 Sheets-Sheet 6
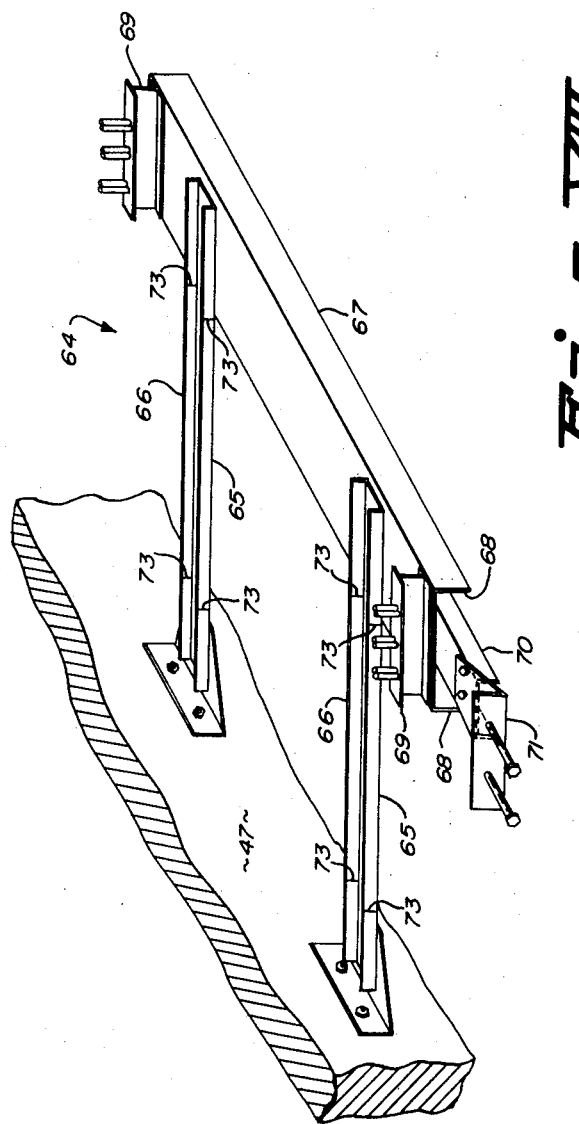
Fig. VIII
INVENTOR.
ROBERT O. BRADLEY
BY
Marshall, Marshall & Yeasting
ATTORNEYS

United States Patent Office 2,901,235
Patented Aug. 25, 1959

2,901,235

PLATFORM SUPPORTING STRUCTURE FOR WEIGHING SCALES

Robert O. Bradley, Toledo, Ohio, assignor, by mesne assignments, to Toledo Scale Corporation, Toledo, Ohio, a corporation of Ohio Application November 21, 1956, Serial No. 623,651

8 Claims. (Cl. 265—71)

This invention relates to weighing scales and in particular to improved mounting means for load cells.

The mounting means is well suited for use with load cells of the strain gauge type wherein a strain-sensitive element is arranged to receive a load and electrical impedance means are connected to the element so as to be controlled by strains induced therein by said load. Various types of strain gauge load cell weighing devices have been proposed and used heretofore, but they have had certain limitations. For example, in platform weighing scales, a plurality of the load cells are located at suitably spaced points to rigidly support a platform or other weight-receiving member. Lateral strains in such rigidly mounted load cells caused by horizontally applied components of forces resulting from, for example, the starting or the stopping of trucks or other vehicles being driven across the platform produce inaccuracies in the weighing results.

It is, therefore, the principal object of this invention to provide means for preventing lateral strains in load cell structure which is used to support the load receiver of a weighing device.

Another object of the invention is to provide improved means to avoid leaning or toppling of articulated load cell structure which is used to support the load receiver of the weighing device.

Still another object of the invention is to provide improved means for preventing substantial turning of the articulated load structure about a vertical axis.

More specific objects and advantages are apparent from the following description of preferred embodiments of the invention.

According to the invention, the improved weighing device includes a stationary base, a load receiver, a strut interposed between the base and the load receiver, a load cell incorporated in the strut, means articulating the strut with the base and with the load receiver to prevent lateral strains in the strut and in the load cell, and means to avoid leaning or toppling of the strut.

Preferred embodiments of the invention are illustrated in the accompanying drawings.

In the drawings:

Figure I is a plan view of a weighing scale installed in a pit and incorporating the improved mounting means for load cells, the load receiver of the scale being removed.

Figure II is a vertical sectional view taken along the line II—II of Figure I as it appears with the load receiver in place.

Figure III is an enlarged vertical sectional view taken along the line III—III of Figure I as it appears with the load receiver in place.

Figure IV is a plan view of a weighing scale installed in a pit and incorporating a modified mounting means for load cells, the load receiver of the scale being removed.

Figure V is a vertical sectional view taken along the line V—V of Figure IV as it appears with the load receiver in place.

Figure VI is an enlarged vertical sectional view taken along the line VI—VI of Figure IV as it appears with the load receiver in place.

Figure VII is an enlarged perspective view of the lower part of the load cell mounting means which is illustrated in Figure VI.

Figure VIII is an enlarged isometric view of the articulated channel iron check mechanism and part of the pit which are illustrated in Figure IV.

Figure IX is an enlarged vertical sectional view taken along the line IX—IX of Figure IV as it appears with the channel iron frame of the load receiver in place.

These specific figures and the accompanying description are intended merely to illustrate the invention and not to limit its scope.

A weighing scale having each corner of a platform or load receiver supported by structure incorporating a strain gauge load cell is illustrated in Figures I and II. This scale includes a load receiving platform 1 laid on girders 2 and located in a pit 3 having a concrete foundation 4 and walls 5. Elastic means in the form of strain gauge load cells 6 are located at suitably spaced points and support the girders 2 of the platform or load receiver 1 from frame members 7 rigidly mounted on concrete piers 8 erected from the foundation 4.

The strain gauge load cells 6, as may be seen in enlarged detail in Figure III, each comprises a relatively heavy base 9 surrounded by a cylindrical casing 10 and a plurality of columns 11. The columns 11, three of which are shown, are five in number and are arranged at the center and mid-sides of a square. Four of the columns 11, those near the cylindrical casing 10, are load carrying columns, being longer than the central column 11, and support the top of the casing and are compressed more or less according to any load applied to the top of the casing 10.

Strain gauge resistance elements 12 and 13 are applied to each of the load carrying columns 11 with the elements 12 located to the right-hand side of the columns as seen in Figure III and the elements 13 on the left-hand side of each of the columns. The strain gauge elements 12 and 13 have electrical characteristics sensitive to distortion of the load carrying columns 11 resulting from strains (deformations) transmitted therethrough. Similar elements 14 and 15 are applied to the central column 11 and serve as temperature compensating gauges. The leads from these elements are carried through an opening 16 in the cylindrical casing 10 of each of the load cells 6, through cables 17 and through watertight and rigid conduits 18 to form a well-known resistance wire strain gauge bridge in conjunction with any suitable instrument for measuring or utilizing for control purposes change of resistance of the strain gauge elements in response to change of strain in the load carrying columns 11, the bridge and the instrument being located, but not shown, in an ordinary scale head 19 adjacent the load receiver 1. When a truck or other vehicle is driven onto the load receiver 1, the load carrying columns 11 are caused to be compressed and a measurement of the change of resistance of the strain gauge elements in response to the compression strain is an indication of the weight of the truck or other vehicle. The elements 12 and 13 of the various columns are distributed between two opposite arms of the bridge and the similar elements 14 and 15 serve as the other arms of the bridge. In this arrangement, the elements 14 and 15 are subjected to the same temperature effects as are the elements 12 and 13 and being located in opposite arms of the bridge result in a temperature compensation so that the output of the bridge circuit is substantially independent of changes in temperature. The strain gauge elements 12 and 13 are located on certain sides of the load carrying columns 11 so that eccentrically applied loads or side thrusts applied to the load receiver 1 and transmitted to the strain gauge load cells 6 result in tension forces in some of the strain gauge elements 12 and 13 and compression forces in the others. By arranging the elements in the same order on the various columns these laterally directed forces can be canceled out as far as the bridge circuit is concerned.

The laterally directed forces or components of forces caused by eccentrically applied loads or side thrusts applied to the load receiver 1, however, cannot be canceled out as far as the load cells themselves are concerned, if the load cells are rigidly mounted and rigidly connected to the load receiver 1 as has been done in prior art weighing devices. It is believed that horizontally applied forces cause load cells rigidly supporting a load receiver to shift or produce a set in operative parts producing inaccuracies in the weighing results. The present invention is not concerned with the design of the load cells themselves, but rather to novel means for connecting the load cells to the load receiver and to a stationary base.

Each of the load cells 6 is incorporated in an articulated strut 20 having two sections one of which is pivotally connected to the load receiver 1 and the other of which is pivotally connected to the frame 7 permitting oscillation of the load receiver 1 without transmitting substantial horizontal force to the load cells. The pivotal connections may be any type of universal joint, e.g., a ball-and-socket joint, hinge joint, link joint, rockably mounted strut joint, etc. The load cells 6 are so pivotally connected that a small restoring force tending to center the load receiver 1 is exerted when the load receiver is laterally displaced by horizontally applied forces. Oscillation of the load receiver 1 caused by large horizontally applied forces resulting from, for example, the starting or the stopping of trucks or other vehicles being driven across the load receiver is limited by means of adjustable stops or bumpers 21 fixed to the underneath edges of the load receiver. Each load cell 6, as may be seen in enlarged detail in Figure III, is pivotally connected to the load receiver 1 by means of an upper rockable joint 22 to permit rolling movement of the load receiver and to the frame 7 by means of a lower rockable joint 23 to permit universal tilting movement of the load cell.

The rockable joints 22 each includes a suspension plate 24 having an insert 25 fixed to one of the girders 2 of the load receiver 1 and the upper section of the strut 20 or suspension post bearing 26 which is threaded into the top of the cylindrical casing 10 of the load cell 6. To prevent rotation of the bearing 26, four equally spaced notches are cut in the very top of the casing 10 and receive pins 27, one of which is shown in Figure III, which extend into holes in the sides of the bearing. The insert 25 and the bearing 26 have cooperating surfaces 28 and 29, respectively, at least one of which must be convexly curved to permit rolling movement of the load receiver 1. As specifically shown, the cooperating surface 28 of the insert 25 is flat while the cooperating surface 29 of the bearing 26 is convexly curved to form a self-restoring rocker at the top of the strut 20 which together with the bumpers 21 function to avoid leaning or toppling of the strut 20.

To satisfy the condition that oscillation of the load receiver 1 is permitted without transmitting substantial horizontal force to the load cells 6 and at the same time to exert a small restoring force tending to center the load receiver when it is laterally displaced by horizontally applied forces, the cooperating surfaces 28 and 29 of the insert 25 and the bearing 26 must have particular degrees of curvature. It is possible by varying the curvature to make the system exhibit either stable equilibrium, neutral equilibrium or unstable equilibrium. The condition which exists depends upon the radii of curvature of the cooperating surfaces and the distance between the cooperating surface 29 of the bearing 26 and the lower end of the strut 20. As specifically shown, the convexly curved surface 29 of the bearing 26 cooperates with the flat surface 28 of the insert 25 and has a spherical radius of curvature greater than the distance between the convexly curved surface 29 and the lower end of the strut 20 to permit rolling movement of the load receiver 1 and to satisfy the condition hereinbefore stated, i.e., oscillation of the load receiver is permitted without transmitting substantial horizontal force to the load cells 6 and at the same time to exert a small restoring force tending to center the load receiver when it is laterally displaced by horizontally applied forces. However, the convexly curved surface 29 of the bearing 26 may have any radius of curvature which permits rolling movement of the load receiver 1.

The rockable joints 23 each includes the lower section 29a of the strut 20 supported on a strut bearing 30 fitted in the bottom of a socket 31 in a member 32 rigidly supported on the frame 7. The member 32 is externally threaded and is supported by an internally threaded base 33 stationarily fixed to the frame 7 of the weighing scale, the internal threads of the base 33 receiving the external threads of the member 32, but which internal and external threads are not shown in the drawings. To accommodate lateral movement of the load receiver 1, the greater portion of the hole in the socket 31 is tapered. This taper is sufficient to accommodate any lateral movement that is permitted by the load receiver stops or bumpers 21. The bottom end of the hole in the socket 31 is cylindrical to closely fit the strut bearing 30. The cylindrical portion of the hole extends upwardly beyond the strut bearing 30 and half way past a groove 34 encircling the bottom end of the strut 20. The strut 20 itself is also closely fitted within the cylindrical bore of the hole in the socket 31. The surfaces at the bottom of the strut 20 are protected against dirt and water by filling the socket around the lower end of the strut with a heavy grease. This grease does not restrict rolling motion of the strut 20 on the bearing 30 but does prevent any dust or dirt that works in around a dust skirt 35, attached to a load cell bearing plate 36 connecting the bottom of the load cell 6 to the strut 20, from settling into and binding in the close clearance between the lower end of the strut and the cylindrical hole in the socket 31. A stop link 37 fixedly attached to the bearing plate 36 by a flat headed screw 38 and loosely attached to the base 33 by a long screw 39 extending through a comparatively long slot 40 in the link 37 is provided to limit tilting movement of the strut 29 and may assist the self restoring rocker at the top of the strut 20 and the bumpers 21 in avoiding leaning or toppling of the strut. The link 37 also prevents substantial turning of the load cell 6 about a vertical axis. To accommodate lateral movement, at least one of the cooperating surfaces 41 and 42 at the bottom of the strut 20 and at the top of the strut bearing 30, respectively, must be convexly curved.

The radius or radii of curvature of the cooperating surfaces 41 and 42 are made as small as possible consistent with satisfactory life of the material and freedom from permanent yield under the maximum expected load force. If the radius or radii of curvature is made too small the stress in the material in the area of contact exceeds the elastic limit and a permanent yield takes place. This has the effect of increasing the radius or radii of curvature of the contacting members and thus makes the system much more stable and increases the transmission of lateral forces to the load cell 6. Since the radius or radii of curvature of the surfaces at the bottom end of the strut 20 are fixed by the strength of the material and the desirability of making them as small as possible, the radius or radii of curvature of the contacting surfaces 28 and 29 at the suspension post bearing 26 are varied to secure the desired equilibrium. As specifically shown in Figure III, the contacting surface 41 of the strut 20 is flat while the contacting surface 42 of the strut bearing 30 is convexly curved. Any radius or radii of curvature of the contacting surfaces permitting universal tilting movement of the strut 20 may be used. In a weighing scale such as is illustrated in Figures I and II which is especially useful for weighing trucks and other vehicles, the diameter of the strut bearing 30 and the radius of curvature of its upper surface 42 are equal and each may be one inch in length.

A second embodiment of the invention is illustrated in Figures IV–IX. Referring to Figures IV and V, the modified weighing device includes a load receiver 43 having a concrete-filled channel iron frame 44 and located in a pit 45 having a concrete foundation 46 and walls 47. Strain gauge load cells 48, like the load cells 6 shown in Figures I–III and hereinbefore described, are located at suitably spaced points and support the load receiver 43 from concrete piers 49 erected from the foundation 46.

Leads from each of the load cells 48 are carried through an opening located at 50 (Figure VI) in the cell, through cables 51 and through watertight and rigid conduits 52 to form a well-known resistance wire strain gauge bridge in conjunction with any suitable instrument for measuring or utilizing for control purposes change of resistance of the strain gauge elements in response to change of strain in the load carrying columns like those illustrated in Figure III, the bridge and the instrument being located in an ordinary scale head located at 53 (Figure IV), but not shown, adjacent the load receiver 43.

Each of the load cells 48 is incorporated in a strut 54 having an upper section 55 and a lower section 56, the strut 54 being articulated at its ends to prevent lateral strains which if they were allowed to exist would affect the accuracy of the load cell output. The top of the upper section 55 and the bottom of the lower section 56 are curved spherically to such a degree and are spaced such a distance from each other that the strut system 54 exhibits unstable equilibrium in contrast to the stable equilibrium strut system shown in Figure III. That is, the strut 54 is inherently unstable. Preferably, the radius of curvature of each of the ends of the sections 55 and 56 is substantially less than one-half of the length of the strut 54 as illustrated in Figure VI. Stability is accomplished by means of horizontally mounted check mechanism fixed to the load receiver and hereinafter described. The curved ends of the strut 54 function to compensate for errors in assembly and in parts and for any possible laterally directed components of forces which for some reason or other get by the check mechanism. The principal difference between the strut 20 (Figure III) and the strut 54 (Figure VI) is that, although both struts are articulated with a load receiver and with a stationary base to prevent lateral strains in the struts, the strut 20 is pivotally connected to the load receiver and to the base in such a way that oscillation of the load receiver is permitted without transmitting substantial horizontal force to the load cell incorporated in the strut 20, while the strut 54 is consantly held in a vertical position and not allowed to rock so that the load cell incorporated in the strut 54 is always concentrically loaded. This later mounting is preferred, since it has been found that it produces the most accurate weighing results. Such concentric loading is insured by the double articulation of the strut 54 as hereinbefore described and by the check mechanism hereinbefore mentioned and hereinafter described in detail.

Each of the upper strut sections 55 is connected to the load receiver 43 through a suspension plate 57 which is fixedly attached to the load receiver and which has an insert 58 that cooperates with the spherically curved top of the upper section of the strut, the bottom of the strut section 55 being rigidly connected to the top of the load cell 48. Each of the lower strut sections 56 is connected to one of the concrete piers 49 through a stationary base 59 which is fixedly attached to the pier and which has an insert 60 that cooperates with the spherically curved bottom of the lower section of the strut, the top of the strut section 56 being fitted into an axially located cylindrical depression is a retainer 61 which is fixedly attached to the bottom of the load cell 48. The retainer 61 is in the form of a shallow inverted cup and serves to shield the lower strut section 56 against dirt and water and also acts to prevent substantial turning of the strut about its axis. As shown in Figures VI and VII, the stationary base 59 is provided with several ribs 62 which cooperate with notches 63 in the retainer 61 to limit movement of the strut about its longitudinal axis.

Stability of the inherently unstable strut 54 is accomplished by means of horizontally mounted check mechanism 64 which is fixed to the load receiver 43 and which functions to prevent horizontal movement of the load receiver and thus to avoid leaning or toppling of the strut 54 and the load cell 48 incorporated therewith. The check mechanism is shown in detail in Figures VIII and IX and is shown incorporated in the weighing scale in Figures IV and V.

The check mechanism 64 includes a pair of channel irons 65 which are fixedly attached to one of the walls 47 of the pit 45 and which extend in the direction of movement of vehicles over the load receiver 43 with the flanges 66 of the channel irons 65 directed upwardly. The ends of the channel irons 65 remote from the wall 47 are fixed to a third channel iron 67 which extends in a direction transverse to the channel irons 65 with its flanges 68 directed downwardly, the third channel iron 67 being supported or hung from the bottom of the load receiver 43 by means of a pair of short I-beams 69 interposed between the load receiver and the third channel iron and fixedly attached to the load receiver and to the third channel iron. The three channel irons 65 and 67, thus, form a generally rectangular frame which is connected to one of the walls 47 of the pit and to the load receiver. A fourth channel iron 70, oriented in a manner similar to that of the third channel iron 67 and located slightly below the third channel iron, is fixedly attached at one of its ends to another one of the walls 47 of the pit by means of a bracket 71 and at its other end to the third channel iron 67 as shown in Figure IX, the fourth channel iron 70 being spaced from the third channel iron 67 by means of a spacer 72 (Figure IX). It is to be appreciated that the channel irons are used merely as readily available shapes and that members having other shapes may be used.

The check mechanism 64, being rigidly attached to the walls of the pit and to the load receiver, functions to prevent any horizontal movement of the load receiver. This avoids leaning of the struts 54 and the load cells 48 incorporated therewith and helps to insure that concentric loading of the load cells always takes place. However, the check mechanism does not prevent vertical movement of the load receiver because each of the flanges 66 of the channel irons 65 is slotted in two places at 73 (Figures IV and VIII) and each one of the flanges of the channel iron 70 is slotted at 74 (Figure IX).

The embodiments of the invention that have been disclosed may be modified to meet various requirements.

This is a continuation-in-part of application Serial No. 481,554 filed January 13, 1955, now abandoned.

Having described the invention, I claim:

1. A weighing device comprising, in combination, a base member having a bearing surface, a load receiver member having a bearing surface, a strut that is interposed between said surfaces and that has a lower end cooperating with the bearing surface of the base and an upper end cooperating with the bearing surface of the load receiver, at least one of the cooperating surfaces at the lower end of the strut being convexly curved with a radius of curvature less than one half of the length of the strut and at least one of the cooperating surfaces at the upper end of the strut being convexly curved with a radius of curvature less than one half of the length of the strut, a load cell incorporated in the strut, the strut being free to turn about its axis, and means on the strut which cooperate with one of the members to limit the movement of the strut about its axis.

2. A weighing device, comprising, in combination, a base having a bearing surface, a load receiver having a bearing surface, a strut that is interposed between said surfaces and that has a lower end cooperating with the bearing surface of the base and an upper end cooperating with the bearing surface of the load receiver, at least one of the cooperating surfaces at the lower end of the strut being convexly curved with a radius of curvature substantially less than one half of the length of the strut and at least one of the cooperating surfaces at the upper end of the strut being convexly curved with a radius of curvature substantially less than one half of the length of the strut, a load cell incorporated in the strut, and means, comprising check mechanism fixed to the load receiver, for avoiding leaning of the strut.

3. A weighing device comprising, in combination, a base member having a bearing surface, a load receiver member having a bearing surface, elastic means that is interposed between said surfaces and that has a lower end cooperating with the bearing surface of the base and an upper end cooperating with the bearing surface of the load receiver, at least one of the cooperating surfaces at the lower end of the elastic means being convexly curved with a radius of curvature less than one half of the length of the elastic means and at least one of the cooperating surfaces at the upper end of the elastic means being convexly curved with a radius of curvature less than one half of the length of the elastic means, a strain gauge on the elastic means, the elastic means being free to turn about its axis, and means on the elastic means which cooperate with one of the members to limit the movement of the elastic means about its axis.

4. A weighing device, comprising, in combination, a base having a bearing surface, a load receiver having a bearing surface, elastic means that is interposed between said surfaces and that has a lower end cooperating with the bearing surface of the base and an upper end cooperating with the bearing surface of the load receiver, at least one of the cooperating surfaces at the lower end of the elastic means being convexly curved with a radius of curvature substantially less than one half of the length of the elastic means and at least one of the cooperating surfaces at the upper end of the elastic means being convexly curved with a radius of curvature substantially less than one half of the length of the elastic means, a strain gauge on the elastic means, and means, comprising check mechanism fixed to the load receiver, for avoiding leaning of the elastic means.

5. A weighing device, comprising, in combination, a base having a bearing surface, a load receiver having a bearing surface, a strut that is interposed between said surfaces and that has a lower end cooperating with the bearing surface of the base and an upper end cooperating with the bearing surface of the load receiver, at least one of the cooperating surfaces at the lower end of the strut being convexly curved with a radius of curvature less than one half of the length of the strut and at least one of the cooperating surfaces at the upper end of the strut being convexly curved with a radius of curvature less than one half of the length of the strut, a load cell incorporated in the strut, the strut being free to turn about its axis, and means on the strut which cooperate with the base to limit the movement of the strut about its axis.

6. A weighing device, comprising, in combination, a base having a bearing surface, a load receiver having a bearing surface, a strut that is interposed between said surfaces and that has a lower end cooperating with the bearing surface of the base and an upper end cooperating with the bearing surface of the load receiver, at least one of the cooperating surfaces at the lower end of the strut being convexly curved with a radius of curvature substantially less than one half of the length of the strut and at least one of the cooperating surfaces at the upper end of the strut being convexly curved with a radius of curvature substantially less than one half of the length of the strut, a load cell incorporated in the strut, means, comprising check mechanism fixed to the load receiver, for avoiding leaning of the strut, the strut being free to turn about its axis, and means on the strut which cooperate with the base to limit the movement of the strut about its axis.

7. A weighing device comprising, in combination, a base having a bearing surface, a load receiver having a bearing surface, elastic means that is interposed between said surfaces and that has a lower end cooperating with the bearing surface of the base and an upper end cooperating with the bearing surface of the load receiver, at least one of the cooperating surfaces at the lower end of the elastic means being convexly curved with a radius of curvature less than one half of the length of the elastic means and at least one of the cooperating surfaces at the upper end of the elastic means being convexly curved with a radius of curvature less than one half of the length of the elastic means, a strain gauge on the elastic means, the elastic means being free to turn about its axis, and means on the elastic means which cooperate with the base to limit the movement of the elastic means about its axis.

8. A weighing device comprising, in combination, a base having a bearing surface, a load receiver having a bearing surface, elastic means that is interposed between said surfaces and that has a lower end cooperating with the bearing surface of the base and an upper end cooperating with the bearing surface of the load receiver, at least one of the cooperating surfaces at the lower end of the elastic means being convexly curved with a radius of curvature substantially less than one half of the length of the elastic means and at least one of the cooperating surfaces at the upper end of the elastic means being convexly curved with a radius of curvature substantially less than one half of the length of the elastic means, a strain gauge on the elastic means, means, comprising check mechanism fixed to the load receiver, for avoiding leaning of the elastic means, the elastic means being free to turn about its axis, and means on the elastic means which cooperate with the base to limit the movement of the elastic means about its axis.

References Cited in the file of this patent

UNITED STATES PATENTS

| | | |
|---|---|---|
| 1,222,272 | Emery | Apr. 10, 1917 |
| 2,379,207 | Williams | June 26, 1945 |
| 2,488,349 | Thurston | Nov. 15, 1949 |
| 2,646,236 | Williams | July 21, 1953 |
| 2,652,241 | Williams | Sept. 15, 1953 |
| 2,666,634 | Williams | Jan. 19, 1954 |
| 2,716,547 | Thurston | Aug. 30, 1955 |
| 2,793,851 | Ruge | May 28, 1957 |